United States Patent [19]
Kaczmarczyk et al.

[11] Patent Number: 5,639,205
[45] Date of Patent: Jun. 17, 1997

[54] PARKABLE GRAPPLE HAVING QUICK ATTACHMENT TO LOADER HOLDER

[75] Inventors: Edward Ted Kaczmarczyk, Welland; James A. Allen, St. Catharines, both of Canada

[73] Assignee: Deere & Company, Moline, Ill.

[21] Appl. No.: 701,940

[22] Filed: Aug. 23, 1996

[51] Int. Cl.$^6$ ........................................ E02F 9/00
[52] U.S. Cl. .................. 414/723; 414/724; 37/468; 37/406
[58] Field of Search .................. 414/723, 724, 414/912, 722; 37/406, 903, 468

[56] References Cited

U.S. PATENT DOCUMENTS

| | | | |
|---|---|---|---|
| 5,123,185 | 6/1992 | Pollard | 37/903 X |
| 5,564,885 | 10/1996 | Staben, Jr. | 414/724 |
| 5,564,886 | 10/1996 | Emerson et al. | 37/903 X |

FOREIGN PATENT DOCUMENTS 57-137532  8/1982  Japan ........................... 37/903

OTHER PUBLICATIONS

John Deere Welland Works Operator's OM-W38952, Issue E8, "Round Bale/Silage Grapple Attachment For 245, 260, 265 and 280 Farm Loaders", (Cover page and pp. 20-4, 30-16, 30-17, 30-18).

*Primary Examiner*—Donald W. Underwood

[57] ABSTRACT

A grapple is constructed for quick attachment to and detachment from holders of an implement carrier. The implement holders of the implement carrier are also designed for quick attachment to and detachment from an implement, such as a loader bucket, to be selectively used in conjunction with the grapple or alone. The grapple has provision for parking it in an attitude ready for attachment to the implement holders when the grapple is not needed for grasping the material being handled.

7 Claims, 7 Drawing Sheets

PARKABLE GRAPPLE HAVING QUICK ATTACHMENT TO LOADER HOLDER

BACKGROUND OF THE INVENTION

The present invention relates to attachments for loaders and more specifically relates to a combination of attachments wherein one of the attachments is a grapple.

Grapples today are often used in combination with another attachment such as a bucket or manure fork. In the case of a bucket, for example, the grapple is usually bolted or pinned to structure mounted to the bucket with the mounted grapple working together with the bucket for handling loads such as large round bales or forage. If an operator desires to use only the bucket the grapple must be disassembled from the bucket or another bucket must be purchased. Further, if the operator desires to use the grapple on another attachment such as a larger bucket or a manure fork, for example, the grapple must be disassembled from the first bucket and installed on the larger bucket or manure fork.

SUMMARY OF THE INVENTION

According to the present invention there is provided an improved grapple for use in conjunction with another loader attachment for grasping loads.

An object of the invention is to provide a grapple attachment which may be quickly attached to and detached from loaders carrying various second attachments.

A more specific object of the invention is to provide a grapple attachment which may be quickly attached to and detached from the holders of an implement carrier, the holders being engagable with a variety of other implements.

These and other objects will become more apparent from a reading of the following description together with the appended drawings.

DESCRIPTION OF THE PREFERRED EMBODIMENT

Figure 1:
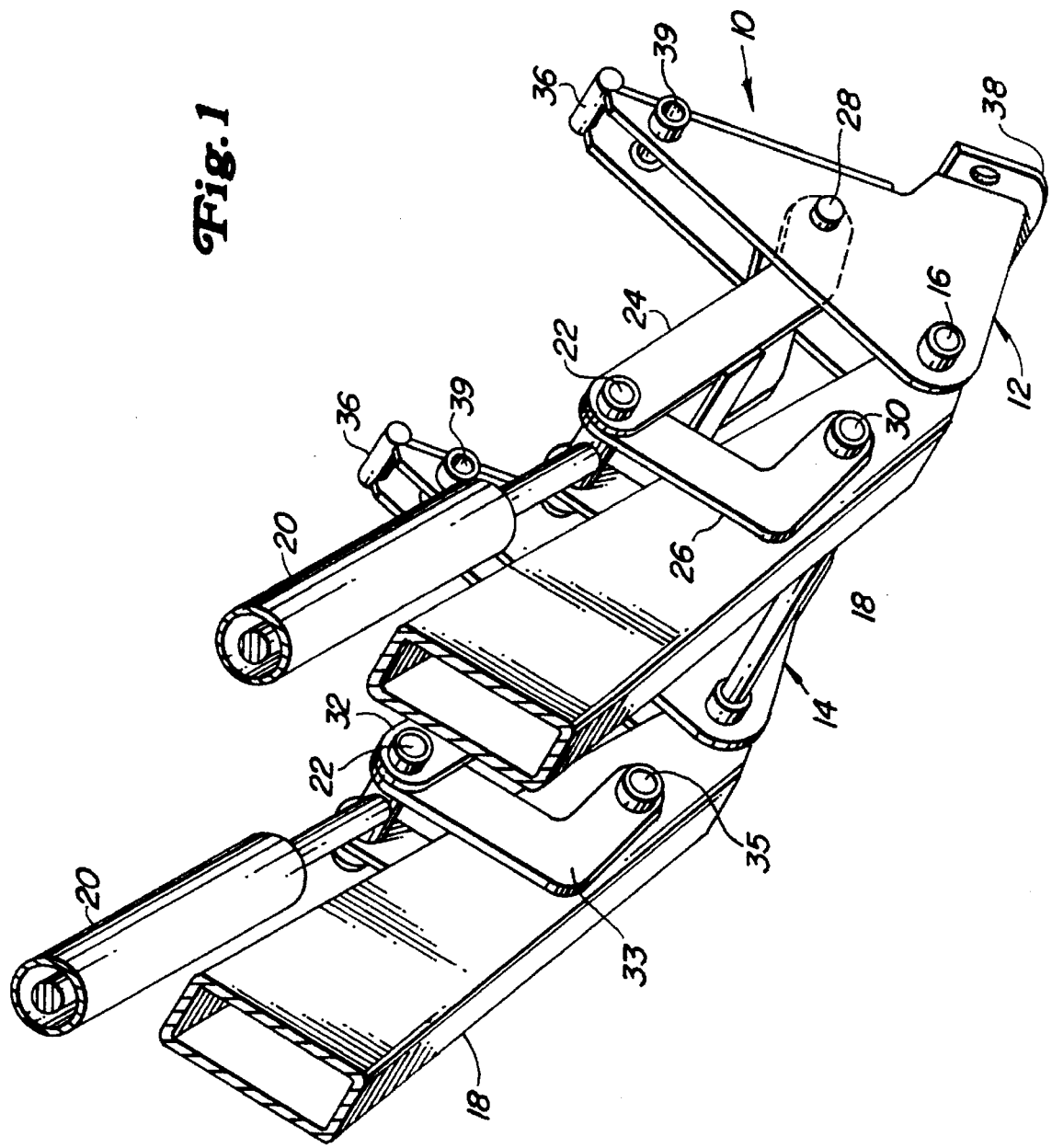
FIG. 1 is a right rear perspective view showing a pair of loader boom arms coupled to a pair of implement holders of an implement carrier used in the present invention.
Figure 2:
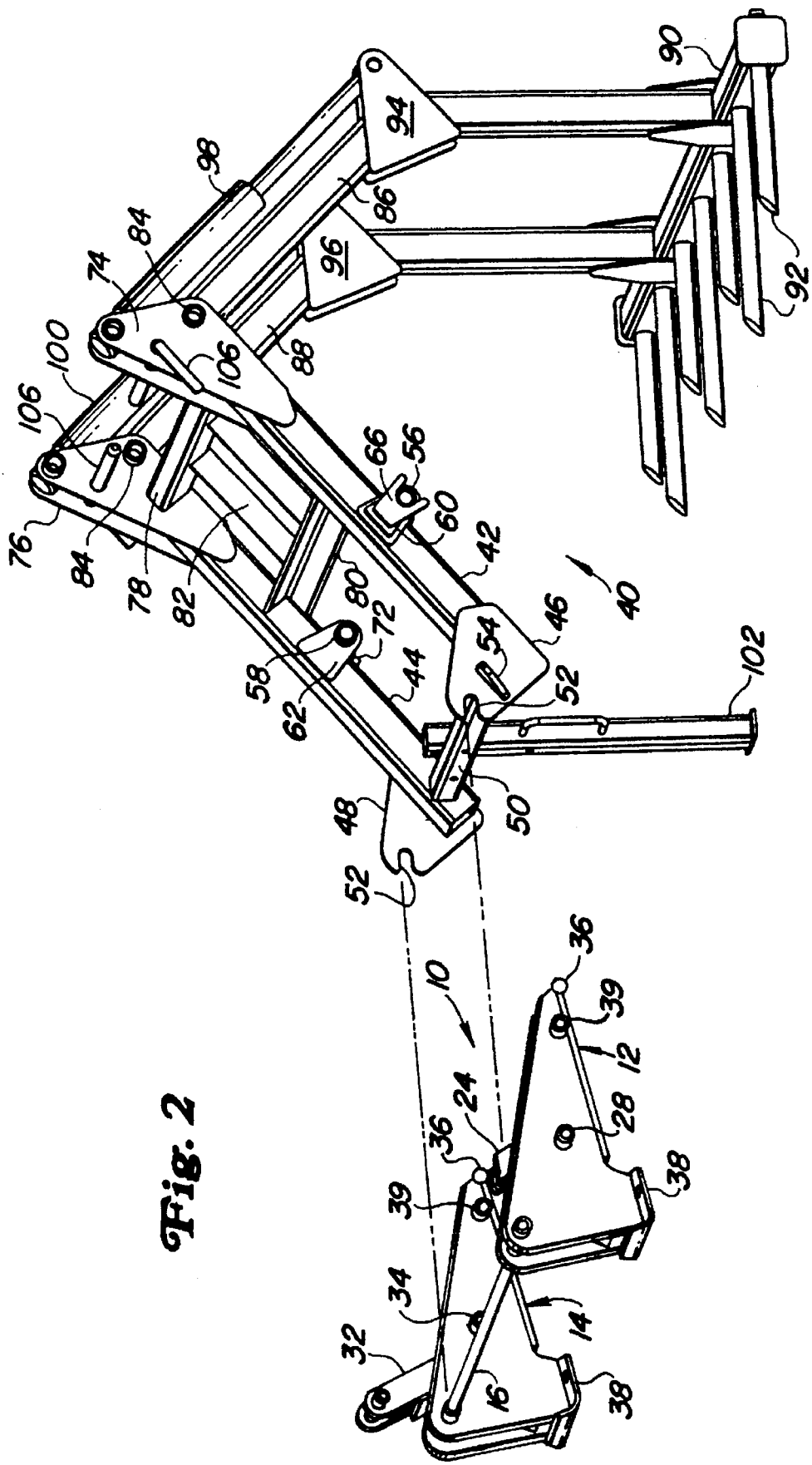
FIG. 2 is a right rear perspective view of an implement carrier and parked grapple with the carrier being rolled forward for connection with the grapple.

Referring now to FIGS. 1 and 2, there is shown an implement carrier 10 (FIG. 2) including transversely spaced, right- and left-hand holders 12 and 14 joined together by by a transverse member or cross rod 16 joining the holders, with the cross rod 16 connecting the carrier to forward end portions of a right- and left-hand hand loader boom arms 18. Right- and left-hand hydraulic tilt acutators 20 are coupled between the boom arms 18 and the implement carrier 10 for tilting the latter about the axis of the cross rod 16. Specifically, the right-hand tilt actuator 20 has its head end pivotally mounted to the right-hand boom arm 18 and its rod end coupled, as by a pivot pin 22, to a first end of each of a right-hand carrier link 24 and a right-hand boom link 26, the carrier link 24 having its other end pivotally coupled to the holder 12 by a pin 28 and the boom link 26 having its other end pivotally coupled to the boom by a pin 30. Similarly, the left-hand hydraulic tilt actuator 20 has its head end pivotally mounted to the left-hand boom arm 18 and has its rod end coupled, as by a left-hand pivot pin 22, to a first end of each of a left-hand carrier link 32 and a left-hand boom link 33, the carrier link having its other end pivotally connected to the left-hand holder 14 by a pivot pin 34 and the left-hand boom link 33 having it other end pivotally connected to the left-hand boom 18 by a pivot pin 35.

It can be seen that the implement carrier holders 12 and 14, are made from channel-like members which are each substantially triangular in side view, with respective transverse mounting pins 36 bridging the channels at first corners of the triangles, with the transverse member or cross rod 16 extending between and joining the holders 12 and 14 at second corners of the triangles and with apertured mounting plates 38 being located at third corners of the holders 12 and 14. Extending transversely through and welded within the channel walls of each of the holders 12 and 14 at a location located adjacent the mounting pin 36 is a holder bushing 39. Forward ends of the loader arms are respectively received in the channels defined by the holders 12 and 14 and are pivotally mounted to the holders by the transverse member 16 for swinging about a pivot axis defined by the member. The hydraulic tilt actuator 20 and its companion (not shown) are operable for selectively effecting pivoting of the carrier 10 about the axis defined by the member 16. Upon the tilt actuators being fully extended, the holders 12 and 14 are rolled forward to the disposition shown in FIG. 2 so as to be ready for accomplishing a first step in effecting their attachment to a parked grapple 40.

Figure 3:
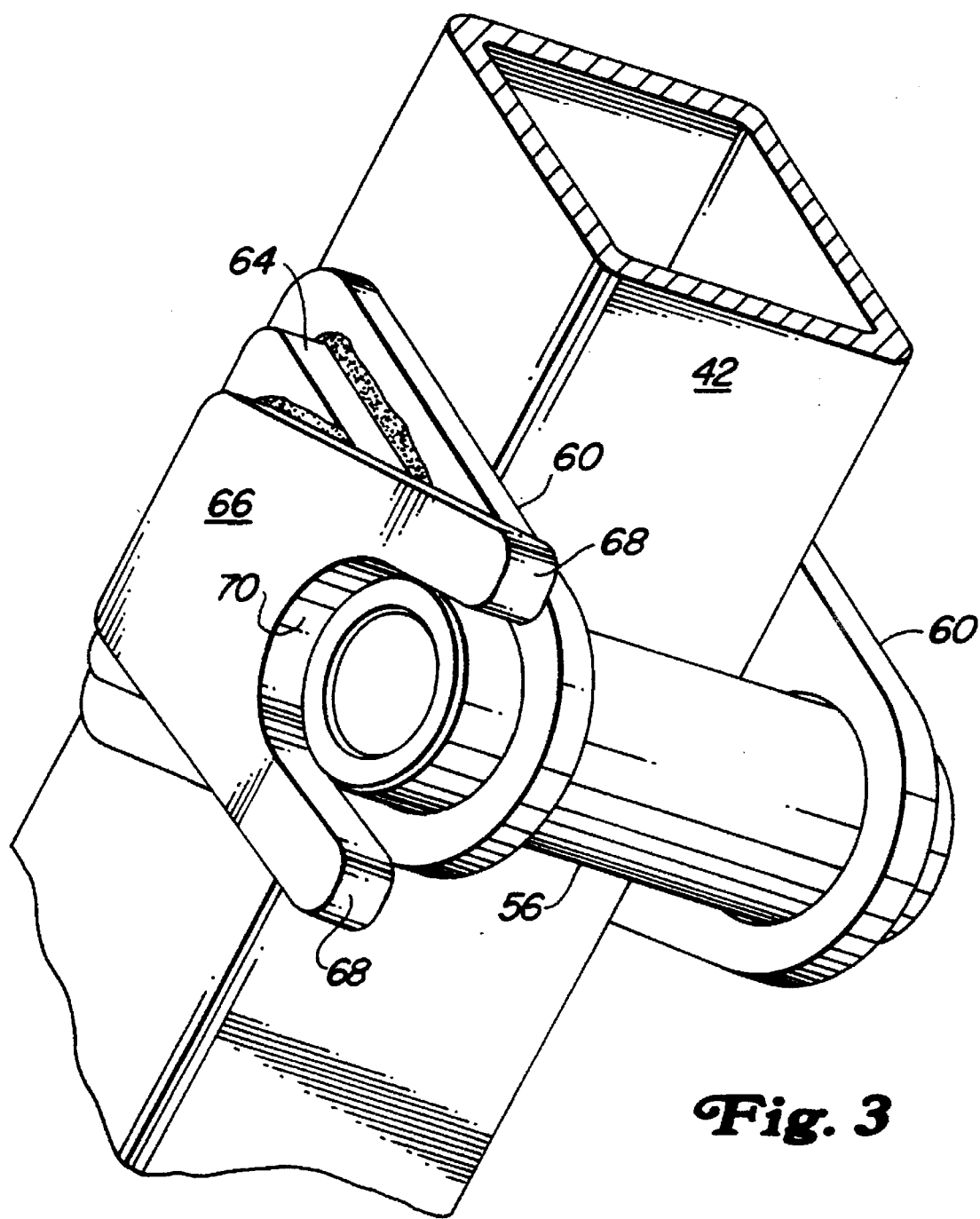
FIG. 3 is a right front perspective view showing details of the mounting of one of the grapple bushings and the associated guide structure for aligning a holder bushing with the grapple bushing.

The grapple 40 includes right- and left-hand support posts 42 and 44, respectively, having outer surfaces of their lower ends respectively welded to inner faces of a pair of parallel plates forming connection brackets 46 and 48, and having inner surfaces of their lower ends joined together by a lower cross member 50. The connection brackets 46 and 48 are respectively provided with rearwardly opening receptacles 52 defined by notches provided in upper rear locations of each of the plates forming the connection brackets while outer surfaces of each of the plates is provided with an outwardly projecting guide ramp 54. Cooperating with, and respectively spaced along the grapple posts 42 and 44 from, the connection brackets 46 and 48 for providing additional coupling points for attaching the grapple 40 to the carrier 10 are axially aligned grapple bushings 56 and 58. The bushing 56 is located at the underside of the post 42 and is fixed in the lower ends of, and has opposite ends projecting a short distance beyond, a pair of parallel plates 60 welded to opposite faces of the post 42. The bushing 58 is similarly located at the underside of the post 44 and fixed in the lower ends of a pair of parallel plates 62 welded to opposite faces of the post 44. Referring now also to FIG. 3, it can be seen that a spacer or filler plate 64 having a thickness equal to the exposed length of the right-hand end of the bushing 56 is welded to an outer face of the plate 60. Welded to an outer face of the spacer 64 is a right-hand, bushing guide 66 having bifurcated free end defined by a pair of legs 68 diverging from a cylindrical surface section 70, the latter being in transverse alignment with that portion of the grapple bushing 56 which is closest to the post 42. A bushing guide 72 is similarly mounted to the outer face of the outer bushing mounting plate 62 associated with the left-hand grapple post 44. Upper ends of each of the posts 42 and 44 are sandwiched between parallel plates forming right- and left-hand grapple arm support brackets 74 and 76, respectively, with inner ones of the bracket plates being joined to each other by an upper cross member 78. An intermediate cross member 80, formed from a length of angle iron, extends between and joins the posts 42 and 44 at a location about half way between the lower and upper cross members 50 and 78. A brace 82, formed from a channel member, extends between and has its opposite ends respectively welded to the upper and intermediate cross members 78 and 80. The support brackets 74 and 76 are generally triangular in side view with respective first corners of the brackets being fixed to the posts 42 and 44 and with respective second corners of the brackets being pivotally connected, as at 84, to rear ends of right- and left-hand angular grapple arms 86 and 88, respectively. Fixed across forward ends of the arms 86 and 88 is a grapple tine support tube 90, and spaced equally from each other along the length of and being releasably secured to the tube 90 are a plurality of grapple tines 92. Right- and left-hand grapple cylinder mounting brackets 94 and 96, respectively, are located at the points of angulation of the arms 86 and 88. Provided for selectively swinging the grapple arms 86 and 88 about a horizontal axis defined by the pivot connections 84, are a right-hand, two-way hydraulic grapple acutator 98 connected between a third corner of the support bracket 74 and the bracket 94, and a left-hand two-way hydraulic actuator 100 connected between a third corner of the support bracket 76 and the bracket 96. When the acutators 98 and 100 are fully extended, as shown in FIGS. 2 and 3, the tines 92 project horizontally rearwardly. The tines 92 are here shown resting on the ground where they work in conjunction with a parking stand or leg 102 that is pivotally mounted to the grapple lower cross member 50 for pivoting about a fore-and-aft axis between a vertical park position, as shown, wherein the leg 102 engages the ground, and a horizontal stored position wherein the leg lays alongside and is pinned, as at 104, to the cross member 50 (FIGS. 5 and 6).

Figure 4:
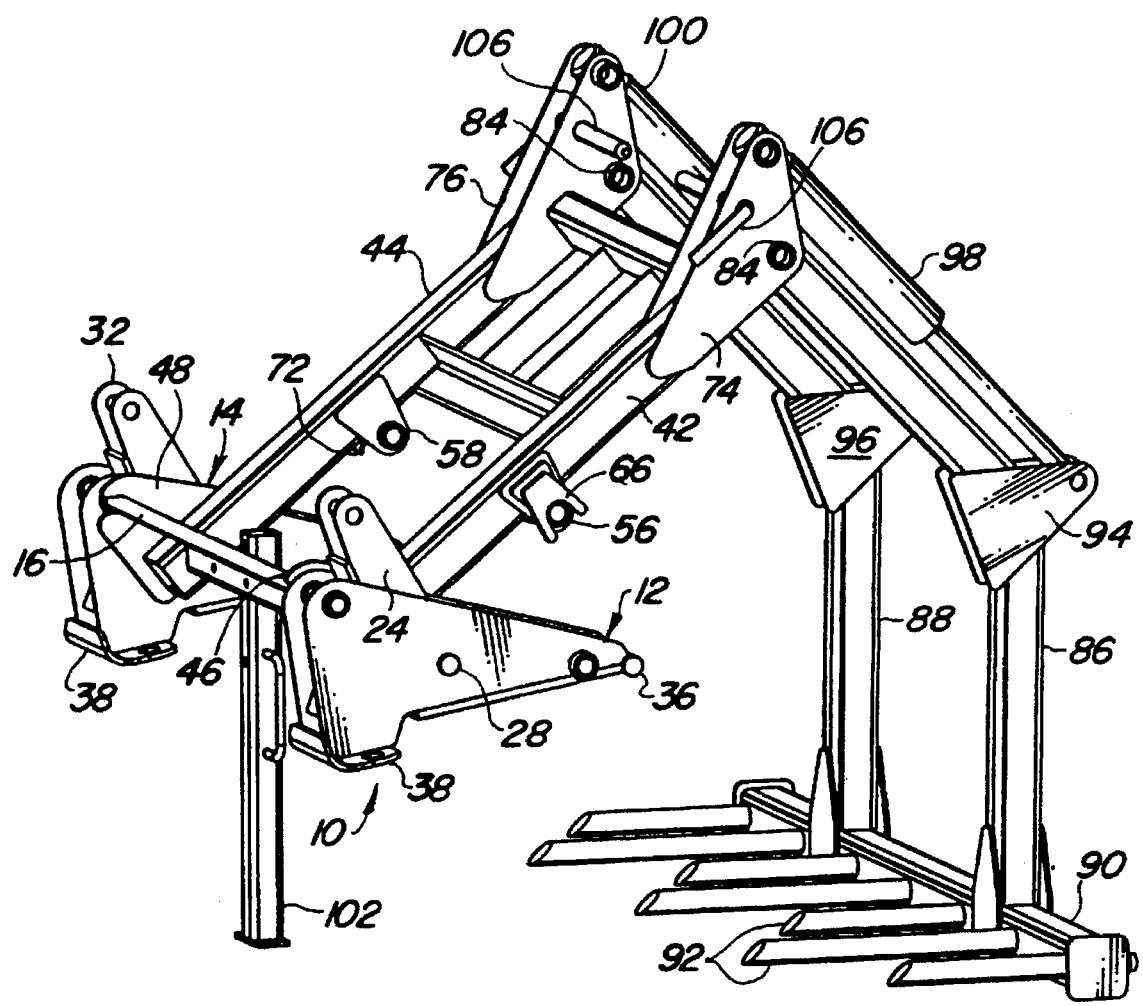
FIG. 4 is a right rear perspective view like FIG. 2 but showing the carrier cross rod received in rearwardly opening receptacles of the grapple connection brackets.
Figure 5:
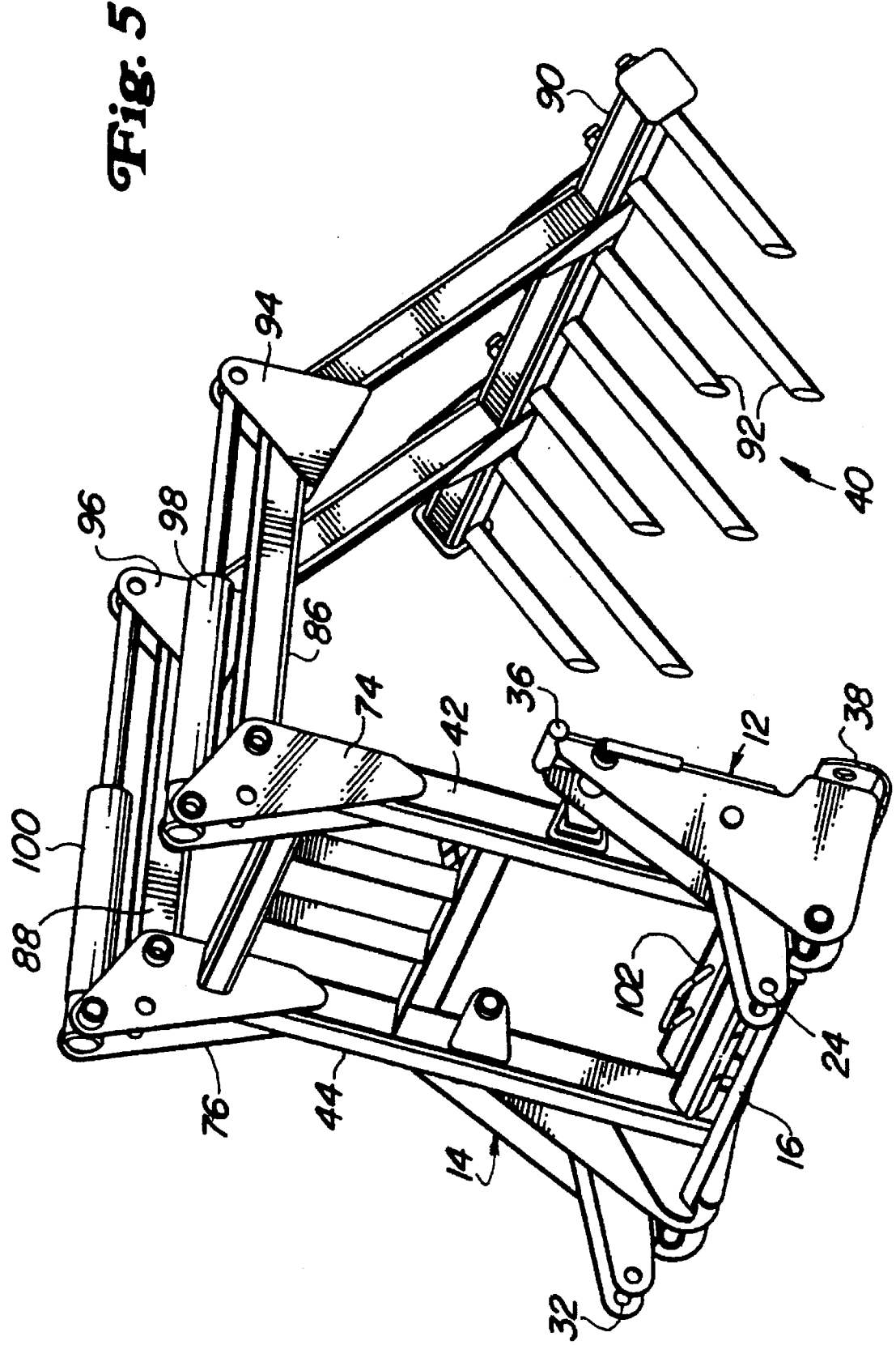
FIG. 5 is a right rear perspective view showing the carrier completely mounted to the grapple.

Referring now also to FIGS. 4 and 5, it can be seen that the carrier 10 has been advanced forwardly from its position shown in FIG. 2 and now has its cross member 16 received in the receptacles 52 of the connection brackets 46 and 48. With the member 16 seated in the receptacles 52, the tilt actuators are retracted to roll back the holders 12 and 14 so that their bushings 39 enter into the downwardly opening bushing guides 66 and 72. The pair of legs 68 of the guide 66 and the corresponding legs of the guide 72 act to direct the holder bushings 39 into engagement with the cylindrical surface 70 of the guide 66 and the corresponding surface (not shown) of the guide 72, the bushings 39 then being in axial alignment with the grapple bushings 56 and 58. A pair of latch pins 106 are then removed from their respective storage locations in the brackets 74 and 76, as shown in FIGS. 2 and 4, and inserted into the aligned bearings, as shown in FIGS. 5 and 6.

Figure 6:
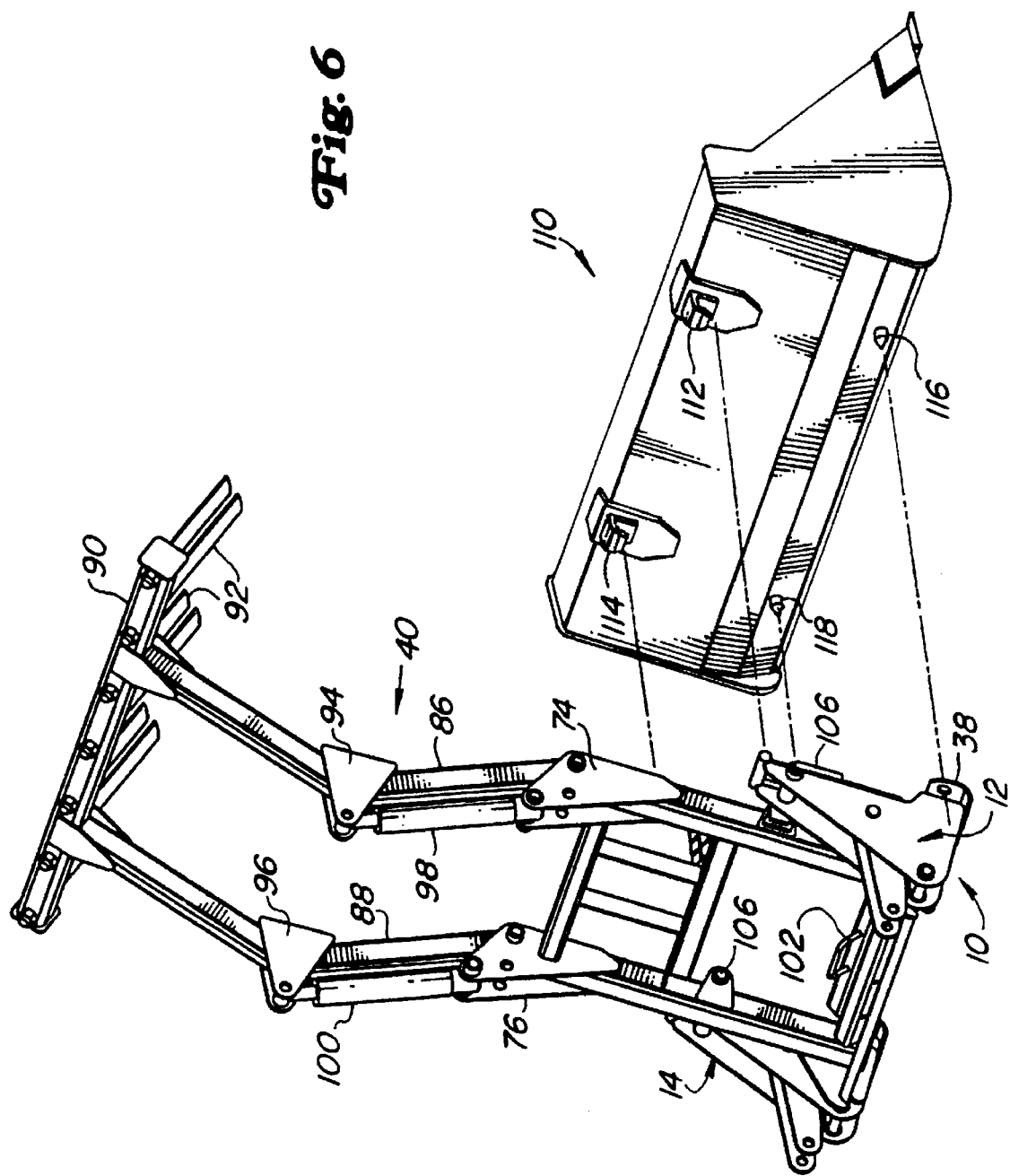
FIG. 6 is a right rear perspective view showing the mounted grapple raised and the carrier disposed for being mounted to the loader bucket.
Figure 7:
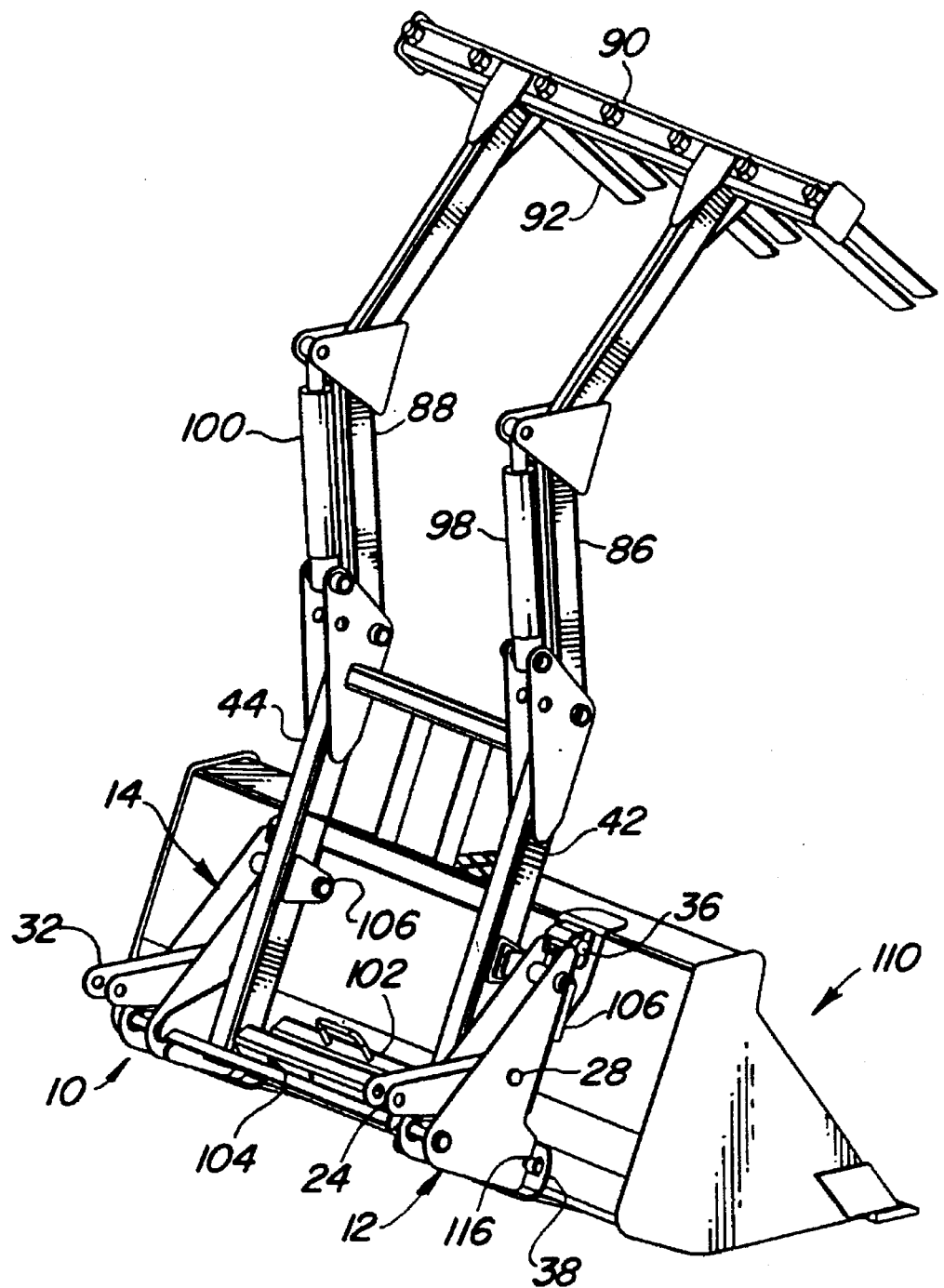
FIG. 7 is a view like FIG. 6 but showing the carrier mounted to the loader bucket.

As shown in FIGS. 6 and 7, the carrier 10 is mounted to the grapple 40 and the grapple actuators 98 and 100 retracted, with the grapple arms 86 and 88 and the tines 92 in a raised condition. Ahead of the carrier 10 is a loader attachment, here shown as a bucket 110, having right- and left-hand downwardly opening hooks 112 and 114 located at transversely spaced locations at upper rear locations of the bucket. The distance between the hooks 112 and 114 is the same as that between the holders 12 and 14. Projecting rearwardly from lower rear portions of the bucket 110 are connection pins 116 and 118 that are respectively offset outwardly relative to the hooks 112 and 114. Referring now to FIG. 7, it can be seen that the mounting pins 36 are engaged in the hooks 112 and 114, and that the connection pins 116 and 118 are received in the apertures of the mounting plates 38. Thus, it will be appreciated that the grapple 40 may then be operated so as to cooperate with the bucket 110 to grasp loads such as large round bales, silage and the like.

The operation of the invention is thought to be understood from the foregoing. It will be appreciated that, if the material being handled requires a different loader implement to be used instead of the bucket, it is necessary only to disconnect the bucket 110 from the holders 12 and 14 and to connect them to the desired different implement. Also, if there is no need for the grapple 40 to be operated in conjunction with an implement in order to handle the material being loaded, the grapple 40 may be merely parked and disconnected from the holders 12 and 14, the holders then being connected to the implement to be used alone. Thus, it will be appreciated that by attaching the grapple 40 to the implement holders 12 and 14 instead of to an implement to be used in conjunction with the grapple, it is not necessary to disassemble the grapple from one implement and reattach it to a different one when it is desired to use the grapple with the different implement, nor is it necessary to buy additional implements in order to use them alone without having to disassemble the grapple from such an implement.

We claim:

1. In combination with a loader having a loader boom including right- and left-hand loader arms, an implement carrier including right- and left-hand, transversely spaced holders joined together by a cross member and being respectively pivotally mounted to forward ends of said pair of loader arms for rocking about a first axis, at least one hydraulic tilt actuator connected between the boom and the implement carrier for selectively pivoting the carrier about said first axis, a loader implement, said holders and implement each having cooperating first quick connection structures releasably securing said implement to said holders, and a grapple mounted for use in conjunction with said implement for grasping loads, the improvement comprising: said right- and left-hand holders and said grapple each including second quick connection structures releasably securing said grapple to said holders.

2. The combination defined in claim 1 wherein said grapple includes right-and left-hand support posts having respective upper and lower ends with right-and left-hand mounting brackets respectively fixed to said lower ends; said right- and left-hand mounting brackets respectively extending alongside said right- and left-hand holders; and said cooperating second quick connection structures including:
 a) a rearwardly opening receptacle provided in each of said right-and left-hand grapple mounting brackets,
 b) transverse member means fixed to said holders and received in said receptacles,
 c) aligned sets of apertures located respectively in said holders and in said right- and left-hand support posts, and
 d) a coupling pin received in each aligned set of apertures.

3. The combination defined in claim 2 wherein said aligned apertures are respectively defined by bushings respectively carried by the holders and by said right- and left-hand support posts; and said support posts each carrying a bushing guide structure for aligning the bushings carried by the holders with those carried by the support posts during mounting the grapple to said holders.

4. The combination defined in claim 2 wherein each of said grapple mounting brackets has a guide ramp projecting outwardly therefrom for aiding in centering the grapple mounting brackets between said holders when said holders are being positioned for connection to said grapple.

5. The combination defined in claim 2 wherein said grapple includes a pair of angular arms respectively pivotally mounted to upper ends of said posts for swinging about a second axis; acutator means coupled between said posts and said arms for effecting pivotal movement of the latter; a grapple tine structure being mounted to an end of said grapple arms and moveable together with said grapple arms to a park position; and a parking leg means being mounted to said grapple posts at a location adjacent said mounting brackets for movement between a stored position free of the ground and a park position engaged with the ground so as to cooperate with said grapple arms to support the grapple in a park position.

6. In a combination including an implement carrier coupled to a loader boom and a grapple adapted for use with an implement attached to said carrier, wherein said carrier comprises right- and left-hand holders joined together by a transverse connecting rod, said right- and left-hand holders respectively being coupled to right- and left-hand loader boom arms for pivoting about a horizontal transverse axis defined by said rod among various positions including a normal upright position, wherein a first connection structure is disposed ahead of said axis and a second connection structure is disposed above said first connection structure, and a forward rolled position, wherein said holders are rotated approximately 90° from said normal upright position so as to dispose said second connection structure ahead of said axis and first connection structure, and said first and second connection structures of said holders being adapted for cooperating with first and second connection structures of an implement so as to define a means for quickly attaching said holders to and detaching said holders from said implement, the improvement comprising: said grapple including a pair of transversely spaced, rearwardly opening receptacles having said transverse connecting rod of said carrier received therein; said holders each carrying a holder bushing located adjacent said second connection structure; and said grapple including transversely spaced grapple bushings; and retaining pin means being inserted in said aligned holder and grapple bushings, whereby said grapple is releasably connected to said carrier and said carrier is adapted for connection to an implement to be used in conjunction with said grapple.

7. In a combination as defined in claim 6 wherein said grapple includes transversely spaced guide members each having a bushing receptacle defined by a pair of legs diverging from a cylindrical surface which is in engagement with a respective holder bushing when the grapple is mounted to the implement carrier, the bushing receptacle being adapted for guiding the holder bushing to the cylindrical surface so as to place the holder and grapple bushings in axial alignment with each other during mounting the grapple to the carrier.

* * * * *